Figure 3A:
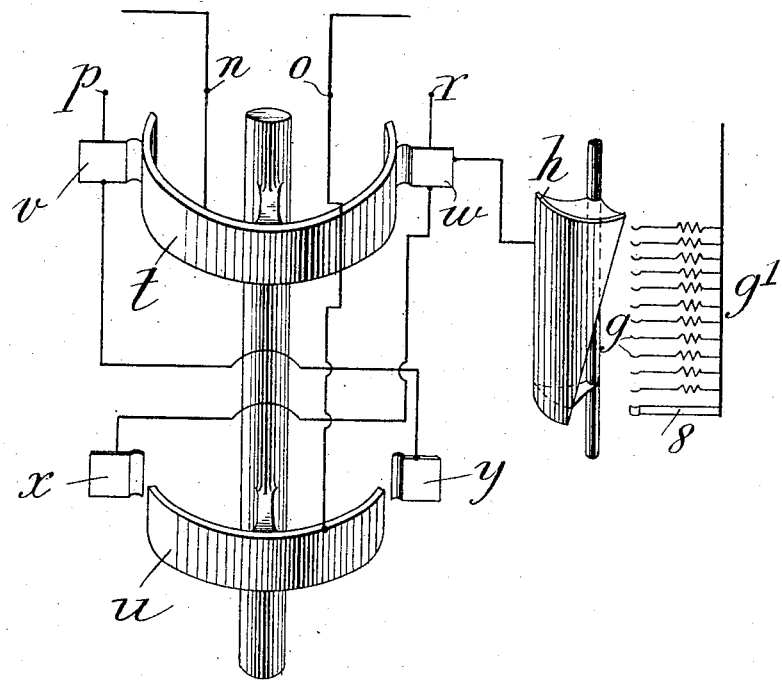

W. A. STEVENS.
POWER TRANSMITTING MECHANISM.
APPLICATION FILED SEPT. 24, 1918.
1,398,656.
Patented Nov. 29, 1921.
2 SHEETS—SHEET 1.
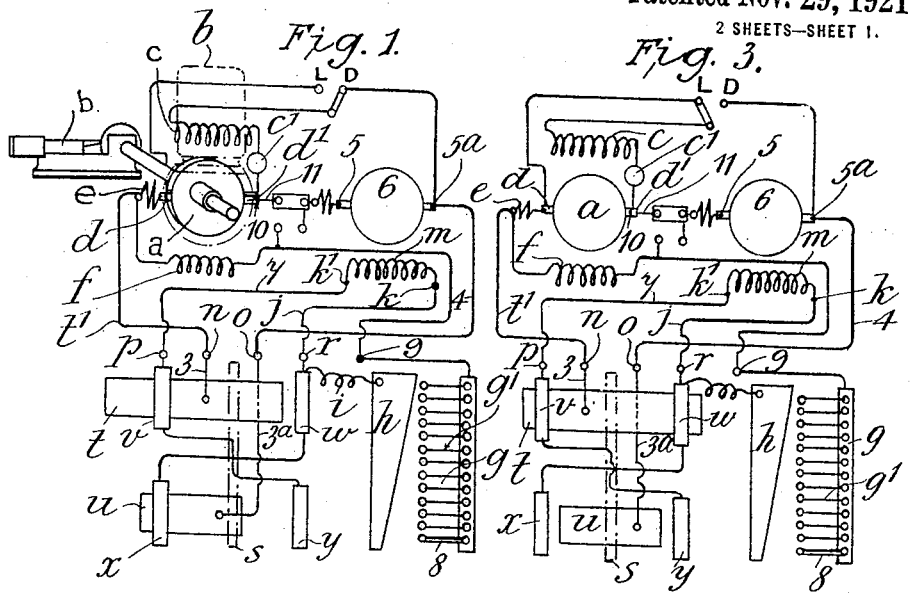
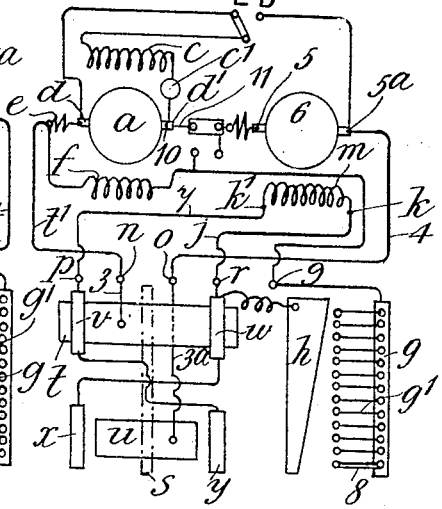
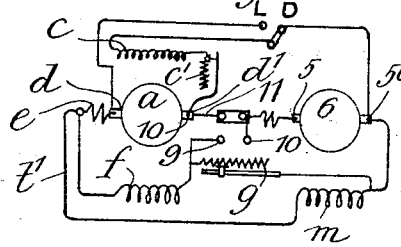
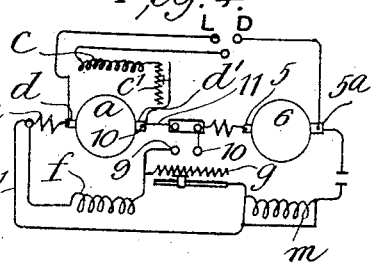
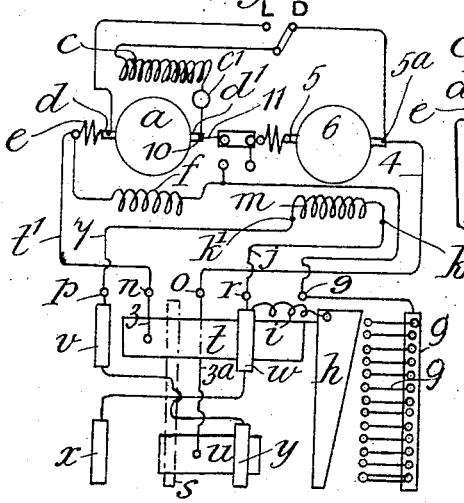
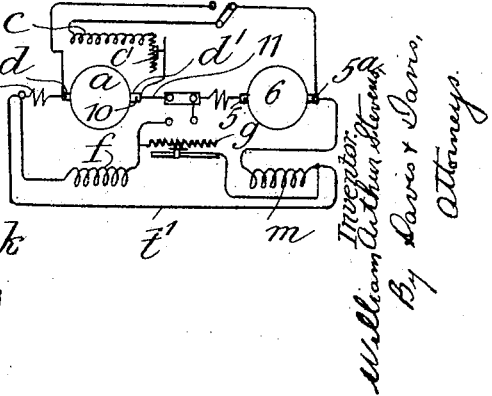

UNITED STATES PATENT OFFICE.

WILLIAM ARTHUR STEVENS, OF MAIDSTONE, ENGLAND.

POWER-TRANSMITTING MECHANISM.

1,398,656.

Specification of Letters Patent. Patented Nov. 29, 1921.

Application filed September 24, 1918. Serial No. 255,433.

*To all whom it may concern:*

Be it known that I, WILLIAM ARTHUR STEVENS, a subject of the King of Great Britain and Ireland, residing at Maidstone, in the county of Kent, England, have invented Improvements in Power-Transmitting Mechanism, of which the following is a specification.

This invention has reference to electrical transmission arrangements, specially applicable for motor vehicles but also suitable for other purposes, for example cranes and the like, rolling mills and so forth, and wherein an electrical generator, driven by a prime mover, such for example as a petrol engine, supplies current to an electric motor driving the vehicle or other body to be actuated.

The object of the present invention is to enable a variable characteristic to be obtained for the electric generator used in such electrical transmission arrangements, for the purpose of varying the power transmitted to the motor for driving the vehicle or other body, and especially for adapting it for supplying current for other purposes than for driving the vehicle or other body, such for example as arc-welding, lighting and electrical power transmission, the characteristic of the machine being variable at will, so that it can run either as an undercompounded, level compounded or over compounded generator, according to the use for which it is for the time being required.

In petrol-electric vehicles of the type in which a shunt wound, or slightly compounded generator supplies current to a series wound motor, the speed ratio between the petrol engine and back axle of the vehicle is generally varied by a variable resistance in shunt with the series windings of the motor and by a variable resistance in series with the shunt winding of the generator, the resistances being successively operated by the same hand lever.

With this arrangement of winding and control, it is necessary for the generator to be only slightly compounded as otherwise the strengthening of the field, due to the increased current required by the series motor when the vehicle is climbing steep hills, would overload the engine and reduce its speed.

With a level compounded generator, the current through the series windings, even with the shunt windings entirely cut out, would so strengthen the field of the generator that when the vehicle is climbing steep hills the engine would be overloaded and not be able to develop its maximum horse power.

To overcome the above mentioned disadvantages and at the same time provide a generator that will compound to any required degree when on a lighting load, the generator according to the present invention is provided with both shunt and series field windings, and the series winding is arranged to be connected as a shunt to the motor series field winding and the current through the generator series field winding is adapted to be varied by a variable resistance, so that the current through the latter winding can be regulated from maximum to zero, according to the requirements of the electric motor. By these means, great economy of working will be obtained, as the current shunted across the motor series field winding is not wasted through a resistance, as in the known system hereinbefore referred to.

As will be seen from the following description of connections, the generator, when used to supply current for lighting purposes, can have its series field winding so shunted by the variable resistance above referred to that its characteristic can be adjusted to any required extent.

Figure 7:
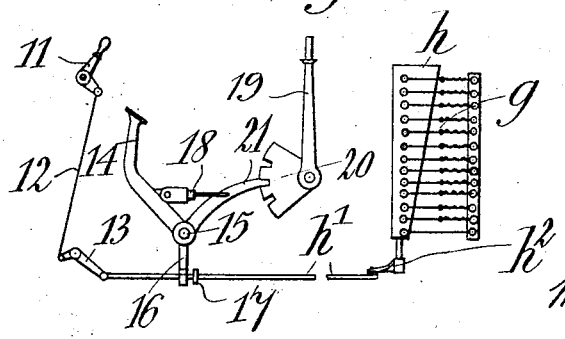

In the accompanying illustrative drawings, Figure 1 shows, diagrammatically, one example of an electrical transmission arrangement embodying the invention, the several windings being connected up for forward running of the motor. Fig. 2 is a simplified diagram showing the electric generator and motor with their windings connected up for forward running. Figs. 3 and 4 are corresponding views to Figs. 1 and 2 but with the several windings arranged in the neutral position suitable for use with a lighting circuit. Fig. 3ª is a perspective view of a portion of Fig. 3. Figs. 5 and 6 are similar views to Figs. 1 and 2 but with the several windings connected up for reverse running of the motor. Fig. 7 is a semidiagrammatic view of control mechanism for association with each of the foregoing figures.

In this example, the electrical generator $a$, preferably of the interpolar type, is driven by an engine $b$, for example a petrol engine, fitted with a governor, which may be adjustable as to speed.

The shunt field winding $c$ of high resistance is connected directly across the brushes $d$, $d^1$ of the generator when the machine is supplying current for lighting purposes and, alternatively, across the brushes 5, $5^a$ of the motor 6 when the vehicle is being driven, the alteration of connections being made by the two-way switch L. D. This shunt winding is capable of exciting the field to produce the required E. M. F. in the armature of the generator when no current is being supplied to the outer circuit. In a four pole machine, this shunt winding can be fitted to two opposite poles, or it may be distributed over all the poles. The current through the shunt winding can be varied for lighting purposes, by means of a multiple contact resistance $c^1$ in circuit with the same, but this resistance will not be used for driving purposes.

From the positive brush $d$ of the generator the circuit divides, it may be after passing through the interpole windings $e$, one circuit being through the series field winding $f$ of the generator, which may be on two opposite poles, or may be distributed over all the poles. This circuit is continued through a variable resistance $g$ to the movable contact $h$ of the resistance device which, in turn, is connected, as by conductors $i$ and $j$, to one terminal $k$ of the motor series field winding $m$. The other circuit is taken to one, say $n$ of two intermediate terminals $n$ and $o$ of a reversing controller having two other and outer terminals $p$ and $r$.

A reversing controller suitable for the purpose of the invention can be constructed as follows:—

Carried by but insulated from the controller spindle $s$ and from each other, are two plain conducting movable segments $t$ and $u$ that are arranged concentrically with and symmetrically to either side of such spindle when the latter is in its mid position (Figs. 3 and 4). The segment $t$ extends through an angular width of say about 210°, and the segment $u$ through an angular width of say about 150°. Mounted on an insulating base or carrier are four stationary contacts $v$, $w$, $x$ and $y$ of which $v$ is connected to terminal $p$ and $w$ to terminal $r$. Contact $v$ is so arranged, as shown, that it can make contact with the left hand side portion of segment $t$, and contact $w$ is so arranged that it can make contact with the right hand side portion of the same segment and contact $x$ can make contact with the left hand side portion of segment $u$ and contact $y$ can make contact with the right hand side portion of the same segment, by suitable rotation of the segments. The contacts $v$ and $x$ are arranged in line with each other and at an angular distance of about 180° from contacts $w$ and $y$ which are also arranged in line with each other, the contacts being cross connected by conductors 1 and 2 so that contacts $v$ and $y$ are electrically connected, as also are contacts $w$ and $x$. Segment $t$ is flexibly connected by conductor 3 to terminal $n$, and segment $u$ is flexibly connected by conductor $3^a$ to terminal $o$ which is connected by conductor 4 to the negative brush $5^a$ of the motor 6. Terminal $p$ is connected by conductor 7 to the second terminal $k^1$ of the motor field series winding $m$ and terminal $r$ is, as hereinbefore stated, connected by conductor $j$ to the other terminal $k$ of such winding and by conductor $i$ to the movable contact $h$ of the variable resistance device $g$. This resistance device comprises as shown, a number of resistances $g^1$ adapted to be successively connected in parallel with one another by movement of the said movable contact $h$ in one direction, and a short circuiting contact 8. One, namely 9, of the lighting terminals 9 and 10 is connected to the junction of the generator series field winding $f$ and the variable resistance $g$ and the other lighting terminal 10 is connected, it may be by way of an ammeter shunt 11, to the negative generator brush $d^1$.

When the spindle $s$ of the reversing controller is in its mid or neutral position (Figs. 3, $3^a$ and 4), segment $t$ electrically connects contacts $v$ and $w$ but segment $u$ does not connect $x$ and $y$ as there is an interval of about 15° between its ends and the center lines of the contacts. By means of this reversing controller it will be seen that the series field winding $m$ of the electric motor 6 is then connected across the terminals $p$ and $r$ of the reversing controller and thus short circuited and that the circuit of the motor from the negative brush $5^a$ by way of the remaining intermediate terminal $o$ is open at the segment $u$. The circuit from the positive brush 5 of the motor to the negative brush $d^1$ of the generator is made by a low resistance conductor which may include the ammeter shunt 11.

The switch connections are such, as shown, that in the "forward" running position of the controller (Figs. 1 and 2), the relative direction of current through the motor series field winding $m$ and motor armature 6 causes the vehicles to be driven in a forward direction. The generator series field winding $f$ is connected through the variable resistance $g$ to the terminal $k$ of the motor series field winding $m$. When the controller is in the said "forward" position, the generator series field winding $f$ and the motor series field winding $m$ are thus connected in parallel, and when the variable resistance $g$ is short circuited, as by the short circuiting contact 8, the current through the generator series field winding $f$ is approximately equal to the current through the motor field winding $m$. Upon then moving the contact $h$ of the variable resistance device in a direction to cut out successive parallel resistances $g^1$ of the resistance device $g$ in circuit with the generator series field winding $f$ and thus increasing the effective resistance, the current through the said winding will be reduced and the current through the motor series field winding $m$ will be correspondingly increased. When the last fixed contact $g^1$ of the variable resistance device $g$ has been reached and passed and the circuit of the generator series field winding $f$ finally broken, all the current from the generator $a$ will pass through the motor series field winding $m$. By the arrangement described, a large speed variation between generator and motor can be obtained.

When the controller is put into the reverse running position (see Figs. 5 and 6), the generator series field winding $f$ with its resistance $g$ in series, is shunted by a circuit of comparatively low resistance, namely through the segment $t$ and a conductor $t^1$, the resistance value of the latter being such as to avoid actual short circuiting. The generator is therefore connected in series with the motor series field winding $m$ but the direction of current through this winding is in the reverse direction to that of the controller shown in Figs. 1 and 2. As the resistance of the said field winding $f$ is also low, sufficient current will then pass through the latter winding to well excite the generator, the shunt field winding $c$ of such generator also assisting. The vehicle will then run in a reverse direction.

To use the electric generator for lighting purposes, it will be necessary to put the reversing controller into the middle or neutral position, Figs. 3 and 4. The connection between the motor armature 6 and its series field winding $m$ will then, as will be seen and as hereinbefore stated, be broken and the motor series field winding $m$ will be short circuited. By movement of contact $h$ of the variable resistance $g$ which is now in parallel with the generator series field winding $f$, the current through the generator series field winding $f$ to the lighting terminal 9 can be diverted to any desired degree, so that the compounding effect on the generator will be at its maximum when the contact $h$ is entirely broken from resistance $g$, and at its minimum when the circuit from contact $h$ to all the parallel resistances $g^1$ and the short circuiting contact 8 is made.

By breaking the circuit of the variable resistance $g$ when driving the motor, the generator will run as a shunt machine.

The movable contact $h$ of the variable resistance $g$ may be arranged to be operated by a pedal, in addition to being operated by a hand lever, in such manner that by the depression of the pedal the current through the generator series field winding $f$ can be reduced to any required extent. In Fig. 7, $h'$ represents a rod adapted to be connected, as for example through a lever arm $h^2$ to a vertical spindle $h^3$ to which is fixed the movable contact $h$ made of segmental shape, the said rod $h^1$ being adapted to be moved to and fro from a hand operated lever 11 through a rod 12 and bell crank lever 13. 14 is a pedal lever pivoted at 15 and provided with an arm 16 adapted, when the pedal is depressed, to engage a collar 17 on the rod $h^1$ and rotate the contact $h$ for the purpose mentioned. The pedal 14 may be the brake pedal and be for this purpose connected to a brake rod 18. This pedal 14 may be interlocked with the change speed lever 19, as by a segmental rack 20 connected to this lever and an arm 21 connected to the brake lever, so that the change speed lever cannot be moved until the pedal lever is fully depressed and the circuit of the generator series field winding broken. The pedal may be the brake pedal, or a separate pedal corresponding to the clutch pedal in an ordinary car. This pedal may be interlocked with the change speed lever so that the latter cannot be moved before the pedal is fully depressed and the circuit of the generator series field winding broken.

What I claim is:—

1. An electrical transmission arrangement of the kind referred to, comprising an electrical generator having shunt and series field windings, a motor having a series field winding adapted to be connected in parallel with the generator series field winding, a lead connecting one brush of the generator to one brush of the motor, a variable resistance connected to one end of the generator series field winding, a controller and leads adapted to connect the said resistance in parallel with the generator series field winding and at the same time short circuit the motor series field winding, and a pair of terminals one connected to the lead directly connecting the generator and motor and the other connected to the lead between the variable resistance and the generator series winding, from which terminals current can be supplied for purposes such as lighting with a variable compounding effect of the generator.

2. An electrical transmission arrangement of the kind referred to, comprising an electrical generator having shunt and series field windings, an electric motor having a series field winding adapted to be connected in parallel with the generator series field winding, a lead connecting one brush of the generator to one brush of the motor, a variable resistance connected to one end of the generator series winding, a controller and leads adapted in one extreme position of said controller to connect the motor for driving in one direction, in another extreme position to effect reversal of the motor and in a mid position to connect the resistance aforesaid in parallel with the generator series field winding, and a pair of terminals one connected to the lead directly connected to the generator and motor and the other connected to the lead between the variable resistance and the generator series winding, from which terminals current can be supplied for purposes such as lighting with a variable compounding effect of the generator.

3. An electrical transmission arrangement of the kind referred to, comprising an electrical generator having shunt and series field windings, an electric motor having a series field winding adapted to be connected in parallel with the generator series field winding, a lead connecting one brush of the generator to one brush of the motor, a variable resistance connected to one end of the generator series winding, a controller and leads adapted in one extreme position of said controller to connect the motor for driving in one direction, in another extreme position to effect reversal of the motor and in a mid position to connect the resistance aforesaid in parallel with the generator series field winding, at the same time short circuiting the motor series winding, and a pair of terminals, one connected to the lead directly connecting the generator and motor and the other connected to the lead between the variable resistance and the generator series winding, from which terminals current can be supplied for purposes such as lighting with a variable compounding effect of the generator.

Signed at London, England, this 4th day of September, 1918.

WILLIAM ARTHUR STEVENS.